United States Patent
Shahid et al.

(10) Patent No.: US 6,273,619 B1
(45) Date of Patent: Aug. 14, 2001

(54) ALIGNMENT SLEEVES FOR INTERCONNECTING OPTICAL FERRULES OF DISSIMILAR SIZE, AND METHODS FOR MAKING SAME

(75) Inventors: Muhammed A. Shahid, Snellville; Steven E. Sheldon, Norcross; Daniel L. Stephenson, Lilburn, all of GA (US)

(73) Assignee: Lucent Technologies Inc., Murry Hill, NJ (US)

(*) Notice: Subject to any disclaimer, the term of this patent is extended or adjusted under 35 U.S.C. 154(b) by 0 days.

(21) Appl. No.: 09/211,117

(22) Filed: Dec. 14, 1998

(51) Int. Cl.$^7$ .................................................. G02B 6/38
(52) U.S. Cl. ................................................ 385/70; 385/55
(58) Field of Search .................................. 385/72, 80, 81, 385/70, 55, 58, 60

(56) References Cited

U.S. PATENT DOCUMENTS

| | | | |
|---|---|---|---|
| 5,179,607 | 1/1993 | Sellers et al. | 385/70 |
| 5,263,106 | 11/1993 | Rosson | 385/72 |
| 5,287,426 | 2/1994 | Shahid | 385/85 |
| 5,388,174 | 2/1995 | Roll et al. | 385/80 |
| 5,444,810 * | 8/1995 | Szegda | 385/139 |
| 5,603,870 | 2/1997 | Roll et al. | 264/1.25 |
| 5,621,834 | 4/1997 | Anderson et al. | 385/72 |
| 5,632,908 | 5/1997 | Shahid | 216/2 |
| 5,633,969 * | 5/1997 | Jennings et al. | 385/62 |
| 5,639,387 | 6/1997 | Shahid | 216/39 |

FOREIGN PATENT DOCUMENTS

| | | |
|---|---|---|
| 0718651 A | 6/1996 | (EP). |
| 58 129408 A | 8/1953 | (JP). |
| 60229004 A | 11/1985 | (JP). |

* cited by examiner

*Primary Examiner*—Frank G. Font
*Assistant Examiner*—Michael P. Stafira
(74) *Attorney, Agent, or Firm*—Alston & Bird, LLP (57) ABSTRACT

An alignment sleeve in accordance with the present invention interconnects optical ferrules of dissimilar size and axially aligns the ferrules with precision in a mating relationship so as to reduce loss in the optical signal passed from one ferrule to the other. A plurality of lands on the inner wall of the alignment sleeve contact and hold the respective ferrules in a predetermined axial relationship with respect to one another. The alignment sleeve comprises a compliant material which conforms to slight variances in the diameters of the ferrules received by the alignment sleeve. The alignment sleeve advantageously provides for the interconnection of ferrules of dissimilar size with precise alignment of their respective cores, which reduces the connection loss of the two ferrules. The alignment sleeve can be mass produced using injection molding techniques. The mold utilized in the injection molding process includes a precision core pin that can be manufactured using a precision grinder or lathe. The accuracy of the core pin may be fine tuned by plating thin layers of metal over portions of the core pin as may be desired to achieve precise sizing in the alignment sleeve. An alignment sleeve fabricated using a precision core pin formed in accordance with the present invention can be inexpensively manufactured with a high degree of precision.

27 Claims, 6 Drawing Sheets

ALIGNMENT SLEEVES FOR INTERCONNECTING OPTICAL FERRULES OF DISSIMILAR SIZE, AND METHODS FOR MAKING SAME

TECHNICAL FIELD

The present invention generally relates to optical fibers, and more specifically, to the interconnection of two optical ferrules.

BACKGROUND OF THE INVENTION

Fiber optic networks are being deployed at an ever-increasing rate due, at least in part, to the large bandwidth provided by fiber optic cables. Inherent with any fiber optic network design is the need to connect individual optical fibers to other optical fibers and to equipment. A common technique for connecting optical fibers is by terminating an optical fiber with a ferrule, and bringing the ferrule into a mating relationship with another ferrule terminating a second fiber. The ferrules are precisely aligned by a cylindrical sleeve which receives two ferrules of similar size and coaxially aligns the longitudinal axes of the respective optical cores thereof. The sleeve is typically a component of a coupler or adapter which securely couples together the plug housings of the respective optical fibers. Examples of such connection systems can be found in U.S. Pat. Nos. 4,738,507 and 4,738,508, both issued to Palmquist and assigned to the assignee of the present invention.

Recent advancements have led to the design of smaller optical fiber connection systems which utilize smaller diameter ferrules. The smaller ferrules offer the advantages of being more proportional in size to the fiber optic cable (thereby being more robust due to the reduced mass/weight of the hardware attached at the end of a fiber optic cable), offering improved axial alignment, and being more space efficient. In particular, the relatively smaller connectors can be more densely packed at the face of a piece of network equipment, and therefore, may provide more efficient space management.

The smaller connector design utilizes a ferrule that is 1.25 millimeters (mm) in diameter. An example of a smaller ferrule connector is the LC connector. Prior to the development of the smaller ferrule connectors, most connectors utilized ferrules that were 2.5 mm in diameter, which is twice the diameter of the ferrule of smaller ferrule connectors. An example of the larger ferrule connector is the ST™ (a trademark of Lucent Technologies, Inc.) connector.

While there are numerous advantages of using the smaller ferrule connectors, some of which are set forth above, there is a compatibility problem with many of the existing optical networks that utilize the larger ferrule connectors. The larger ferrule connectors have been utilized for several years, and have been expansively deployed in optical networks. It is cost prohibitive in most situations to replace existing optical fiber components with newer components that utilize the smaller ferrule connectors. Therefore, when performing equipment or hardware upgrades or installations to existing optical networks, wherein the new equipment or hardware is designed for use with a smaller ferrule connector and the existing equipment or hardware is designed for use with a larger ferrule connector, the technician is faced with the problem of how to interconnect two optical terminations having ferrules of dissimilar sizes. Thus, a need exists in the industry for an efficient and cost-effective method for interconnecting two different sized ferrules in an optimized mating relationship.

One proposed solution is the use of hybrid optical cables which have a larger ferrule connector on one end to match with the installed network interfaces and a smaller ferrule connector on the opposite end to match with the optical interfaces of the new/upgrade equipment. While such hybrid optical cables provide a relatively straightforward solution, they are relatively cumbersome to use, require two connections in order to interface two optic fibers (i.e., adding an additional connection and the resulting unwanted attenuation and/or other losses), and are relatively expensive.

Yet another proposed solution is a step sleeve adapter which comprises a cylindrical sleeve having coaxially aligned cylindrical bores of different sizes formed into opposite ends of the sleeve and meeting in the middle thereof. Accordingly, at approximately the middle of the step sleeve, the inside diameter of the sleeve, as defined by the bores, changes from a first inside diameter (e.g., corresponding to a smaller ferrule) to a second inside diameter (e.g., corresponding to a larger ferrule). This design requires precise alignment and sizing of the bores, and the precise sizing of the ferrules in order to establish and secure an accurate alignment of the two ferrules received within the sleeve. In practice, such precision is not consistently reproduced economically. For instance, some of the most accurate 1.25 mm ferrules have an outside diameter variance of approximately ±0.7 micrometers ($\mu$m), and some of the most accurate 2.5 mm ferrules have an outside diameter variance of approximately ±0.5 $\mu$m. Since the metal or ceramic material comprising the step sleeve is not compliant so as to be able to accommodate variances in either the bore inside diameter or the ferrule outside diameter, the normal and expected variances in the inside bore diameter and the ferrule outside diameter may result in a fit that is not satisfactory, that is, the mechanical stability of the ferrule within the bore may be inadequate for certain applications. For example, a ferrule with an outside diameter less than the outside diameter for which a bore is designed may fit loosely within the bore, allowing transverse loads to misalign the cores of the ferrules within the sleeve. This may result in unwanted and uncontrollable connection loss.

Further, such step sleeves are typically made of a metal which has a high coefficient of thermal expansion thereby making the sleeve particularly sensitive to temperature changes. The step sleeve may be made of a ceramic material in the alternative, which has a more advantageous coefficient of thermal expansion, though a ceramic sleeve would be expensive to manufacture.

Therefore, an unsatisfied need exists in the industry for a low-cost connector for interconnecting optical conductors of dissimilar size with precision alignment of the respective cores thereof.

SUMMARY OF THE INVENTION

The present invention provides for an alignment sleeve for interconnecting optical ferrules of dissimilar size. An alignment sleeve in accordance with the present invention receives two ferrules of dissimilar size and axially aligns the ferrules with precision in a mating relationship so as to reduce connection loss in the optical signal passing from one ferrule to the other. For purposes of the present disclosure, references made herein to the dissimilar size of two optical ferrules refers to the outside diameters of the respective optical ferrules. The precision alignment of the two ferrules is achieved in part by a plurality of lands which contact and hold the respective ferrules in a predetermined axial relationship with respect to one another. The alignment sleeve comprises a compliant material which conforms to slight variances in the diameters of the ferrules received in the alignment sleeve. Therefore, the alignment sleeve may reduce connection loss caused by ferrule misalignment or ferrule movement resulting from slight variances in the outside diameter of the ferrules.

An alignment sleeve in accordance with the present invention can be mass produced using injection molding techniques, which are relatively low cost. The mold utilized in the injection molding process includes a precision core pin that can be manufactured using a precision grinder or lathe. The accuracy of the core pin may be finely adjusted by plating a thin layer of metal to selected regions of the core pin as may be desired to achieve precise sizing in the alignment sleeve. Thus, an alignment sleeve fabricated using a precision core pin formed in accordance with the present invention can be inexpensively manufactured with a high degree of precision.

In accordance with an aspect of the present invention, an alignment sleeve for axially aligning ferrules comprises a support member defining a substantially central bore therethrough. The bore may include a first portion and a second portion, wherein the first portion and a second portion are longitudinally aligned and proximate one another. The support member includes a first inner wall which at least partially defines the first portion, wherein the first inner wall includes a plurality of first lands that are angularly spaced about the first inner wall and are sized to receive a first ferrule of a first diameter. The support member includes a second inner wall which at least defines the second portion, wherein the second inner wall includes a plurality of second lands that are angularly spaced about the second inner wall and sized to receive a second ferrule of a second diameter that is dissimilar to the first diameter.

By the particular design of the lands of the first portion and the second portion, respectively, a first ferrule received in the first portion and a second ferrule received in the second portion may be co-axially aligned, or axially offset by a predetermined distance. The support member comprises a compliant material, such as a plastic, so as to accommodate slight variances in the size of the respective ferrules. In particular, the support member may radially expand to conform to a ferrule received therein.

In accordance with another aspect of the present invention, an alignment sleeve for axially aligning ferrules comprises a support member defining a substantially central bore therethrough. The bore includes a first portion sized to receive a first ferrule of a nominal first diameter and a second portion sized to receive a second ferrule of a nominal second diameter that is dissimilar to the first diameter. The first portion and the second portion are longitudinally aligned and proximate one another. The support member includes a compliant first wall at least partially defining the first portion, wherein the first wall is deformable to accommodate slight variances in the first diameter. The support member also includes a compliant second wall at least partially defining the second portion, wherein the second wall is deformable to accommodate slight variances in the second diameter.

The first wall may include a first inner surface having a plurality of first lands, and the second wall may include a second inner surface having pluralities of second lands. By the design of the first and second lands, a first ferrule received in the first portion and a second ferrule received in the second portion may be co-axially aligned, or axially offset by a predetermined distance.

In accordance with another aspect of the present invention, a method for forming a precision core pin for use in making a ferrule alignment sleeve by an injection molding process comprises fabricating a cylindrical pin including a first pin portion of a first diameter and a second pin portion of a second diameter that is dissimilar to the first diameter, and fabricating a plurality of flats on each of the first and second pin portions. The core pin may include a longitudinal taper over the length of the core pin to facilitate removal of the core pin during the injection molding process. Preferably, there are three equally angularly spaced flats on each of the first and second pin portions, wherein the flats are parallel to the central axis of the core pin. Preferably, each of the flats on the first pin portion correspond to a parallel flat on the second pin portion.

In accordance with another aspect of the present invention, a method for making an alignment sleeve for axially aligning ferrules of dissimilar size comprises the step of providing a mold, including a precision core pin having a first pin portion of a first diameter and a second pin portion of a second diameter which is dissimilar to the first diameter. Further, the core pin includes a plurality of flats on each of the first and second pin portions. Another step comprises fabricating an alignment sleeve about the core pin using the mold, wherein the alignment sleeve includes a first bore for receiving a first ferrule of a first diameter, and a second bore, axially aligned with the first bore, for receiving a second ferrule of a second diameter. The axial alignment of the first ferrule and the second ferrule may be co-axial or axially offset by a predetermined amount. The alignment sleeve is preferably fabricated of a material comprising polyetherimide.

The first pin portion and a second pin portion of the core pin may be selectively plated with a thin metal layer to increase the inside diameter of the respective bores. In addition, the method may include a quality control step of measuring either the insertion force or the removal force of a ferrule in the alignment sleeve. Information from the quality control step may be used to adjust molding parameters for subsequent molded sleeves to meet insertion force requirements.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

The present invention can be better understood with reference to the following drawings. The elements of the drawings are not necessarily drawn to scale, emphasis instead being placed upon clearly illustrating the principles of the present invention. Furthermore, like reference numerals designate corresponding parts throughout the several views.

DETAILED DESCRIPTION OF THE PREFERRED EMBODIMENTS

The present invention now will be described more fully hereinafter with reference to the accompanied drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
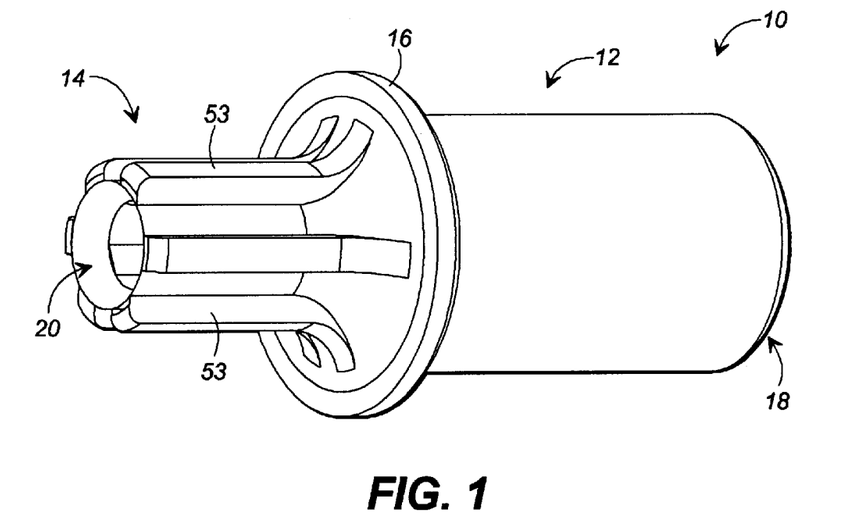
FIG. 1 is a perspective view of an alignment sleeve in accordance with an embodiment of the present invention.

With reference to FIG. 1, an alignment sleeve 10 in accordance with an embodiment of the present invention is illustrated. The alignment sleeve 10 includes a relatively larger ferrule portion 12 and a relatively smaller ferrule portion 14, which are axially aligned and proximate one another. A retaining ring 16 is disposed at the interface of the larger ferrule portion 12 and smaller ferrule portion 14. The retaining ring may operate in conjunction with a plurality of latching arms, whereby the alignment sleeve 10 may be press fitted within a coupling and latched in place by spring loading latching arms, as described in greater detail in U.S. Pat. No. 5,621,834, entitled "Closed Alignment Sleeve," which is assigned to the assignee of the present invention, and the disclosure of which is incorporated herein by reference as is set forth in full. Alternatively, the alignment sleeve 10 may have a substantially cylindrical outer surface sized to fit in the coupling of a conventional connector, and as well known to those skilled in the art.

The alignment sleeve 10 includes a larger ferrule aperture 18 for receiving a ferrule of relatively large diameter, such as the 2.5 millimeters (mm) ferrule of the ST™ (trademark of Lucent Technologies, Inc.) connector, into the larger ferrule portion 12. A smaller ferrule aperture 20 is disposed opposite the larger ferrule aperture 18 for receiving a ferrule of relatively small diameter, such as the 1.25 mm ferrule of the LC connector, into the smaller ferrule portion 14.

Figure 2:
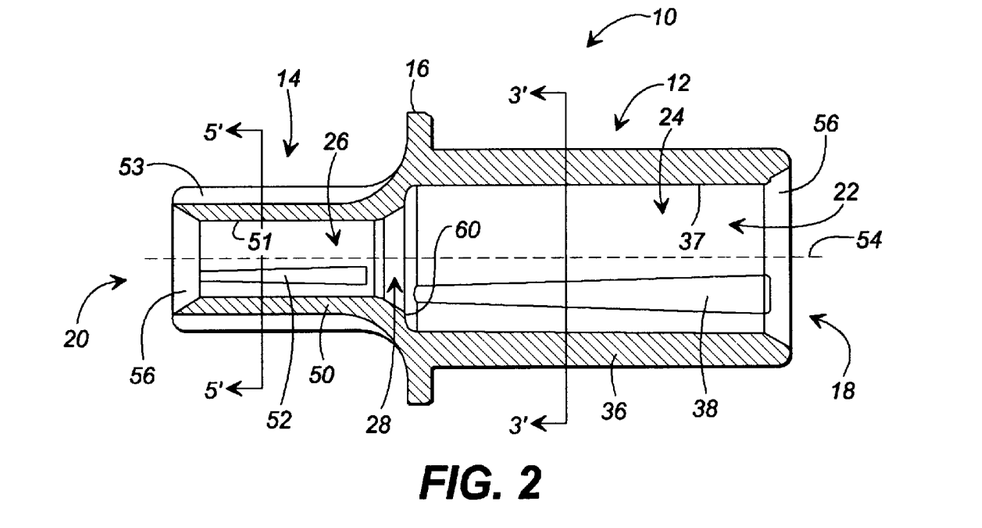
FIG. 2 is a cross-sectional view illustrating the central bore of the alignment sleeve of FIG. 1, taken along lines 2'—2'.

With reference to FIG. 2, the larger ferrule aperture 18 and the smaller ferrule aperture 20 are interconnected by a central bore 22 which comprises a larger ferrule bore 24 of a first inside diameter and a smaller ferrule bore 26 of a second inside diameter which is smaller than the first inside diameter. The larger ferrule bore 24 and the smaller ferrule bore 26 are interconnected by a transition region 28. The larger ferrule bore 24 is defined by a wall 36 having an inner surface 37 which includes a plurality of lands 38. In the preferred embodiment, there are three lands 38. As well known, a cylindrical ferrule can be located with precision with three contact lines as provided by the lands 38. The lands 38, while illustrated herein as flat surfaces, can take other suitable forms which provide precision alignment of a ferrule that is received with the alignment sleeve 10, such as projections or risers.

Figure 3:
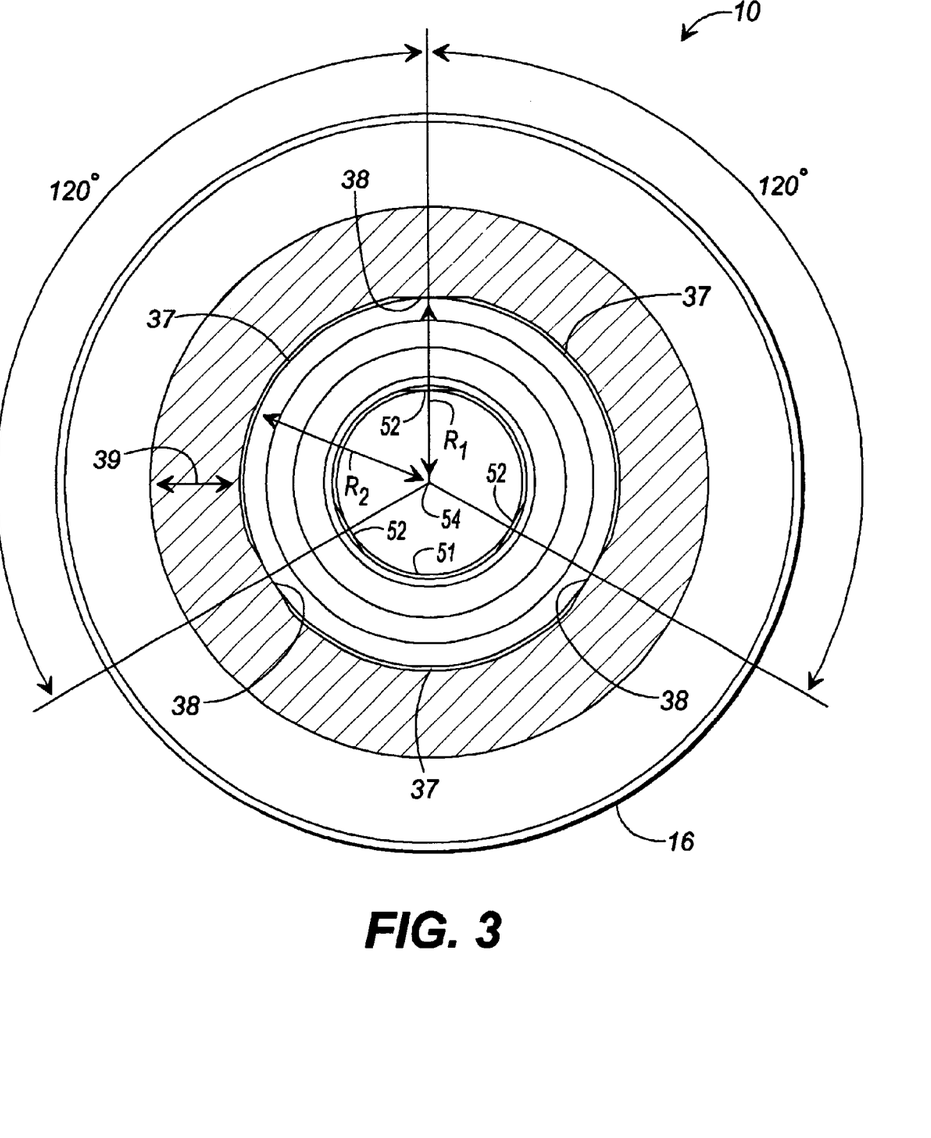
FIG. 3 is a cross-sectional view of the larger ferrule portion of the alignment sleeve of FIG. 2, taken along lines 3'—3'.

As illustrated in FIG. 3, the lands 38 are angularly spaced equally apart from one another about the inner surface 37, such that the center of each land 38 is approximately 120° from the centers of the other lands 38. The inside radius $R_1$ of the larger ferrule portion 12 at the lands 38 is approximately 1.247 mm (defining an inside diameter of 2.494 mm), whereas the radius $R_2$ at the inner surface 37 is approximately 1.255 mm (defining an inside diameter of 2.51 mm). The thickness 39 of the wall 36 is approximately 0.51 mm.

Advantageous to the design of the present invention, the size of the individual lands 38 can be selectively controlled to precisely locate a ferrule within the larger ferrule portion 12. For instance, by making the three lands 38 the same size such that the radius from the central axis of the larger ferrule bore 24 to the center of each land 38 is equal, then a ferrule received within the larger ferule portion 12 is substantially co-axially aligned with the larger ferrule bore 24. However, if two of the lands 38 are of a first size such that the two lands 38 are a first radius from the central axis of the larger ferrule portion 24 and the third land 38 is of a second size such that the third land is a different radius from the central axis of the larger ferrule portion 24, and the inside diameter of the three lands 38 is still 2.494 mm (as described above), then a ferrule received within the larger ferrule portion 12 will be axially offset with respect to the central axis of the larger ferrule bore 24. Thus, the present invention provides for flexibility in the design of the alignment sleeve for implementing desired functionalities, such as an optical attenuator or offset launch condition, as described below.

Figure 4:
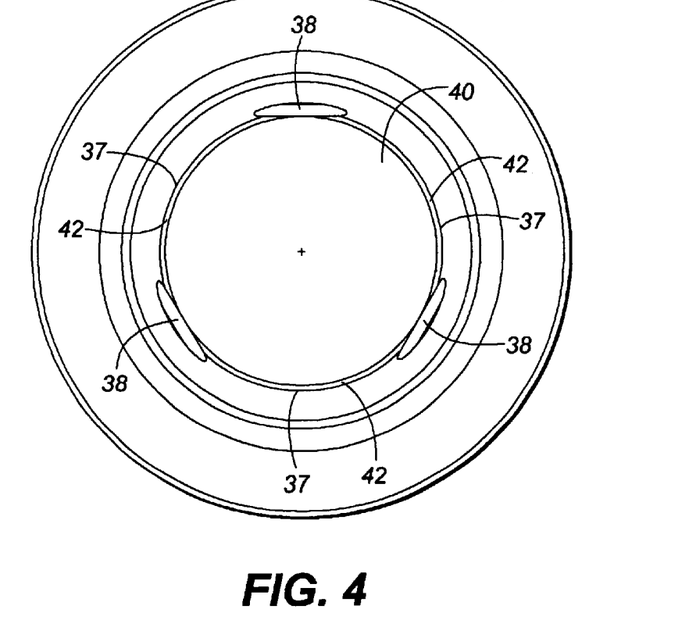
FIG. 4 is an end view of the larger ferrule portion of an alignment sleeve in accordance with an embodiment of the present invention, wherein a ferrule is received within the large ferrule portion of the alignment sleeve.

Accordingly, as illustrated in the end view of FIG. 4, a 2.5 mm ferrule 40 received in the larger ferrule portion 12 of the alignment sleeve 10 will contact the larger ferrule portion 12 at lands 38, leaving a small amount of clearance 42 between the ferrule 40 and inner surface 37. Since the lands are designed to have a smaller radius than the ferrule 40, contact with the lands 38 is assured. The three land design allows for the maximum angular distance between the lands while still being able to accurately locate the ferrule within the alignment sleeve 10. By maximizing the distance between the lands 38, the flexibility of the wall 36 between the lands 38 is increased, which enables the alignment sleeve 10 to conform to greater variances in the diameters of the ferrules received therein.

With reference back to FIG. 2, the smaller ferrule bore 26 is defined by a wall 50 having an inner surface 51 which includes a plurality of lands 52. As with the lands 38, the lands 52 can be individually designed to impart a desired function, such as the precise co-axial alignment or axial offset alignment of a ferrule received within the smaller ferrule portion 12 with respect to the central axis of the smaller ferrule bore 26. Ribs 53 are disposed about the outside of wall 50 to facilitate material flow in the smaller ferrule portion 14 during the injection molding process, as discussed in detail below.

The beveled surfaces 56 at the larger ferrule aperture 18 and the smaller ferrule aperture 20 facilitate the entry of ferrules into the alignment sleeve 10 at the respective ferrule apertures 18, 20. The interface region 28 includes a stop surface 60 against which the ferrule received in the larger ferrule bore 24 rests within the alignment sleeve 10. The stop surface 60 compensates for disproportionate axial loading provided by larger ferrule connectors, such as the ST™ connector, and the smaller ferrule connectors, such as the LC connector.

It is noted for purpose of clarity that the central bore 22 includes a gradual taper of a predetermined angle from the larger ferrule aperture 18 to the smaller ferrule aperture 20 to facilitate the removal of a precision core pin utilized in the injection molding process used to fabricate the alignment sleeve 10, as discussed in greater detail below. The lands 38, 52 do not incorporate this taper, but are parallel through their longitudinal length with a central axis 54 of the central bore 22. Accordingly, the resulting optical effect is that the lands 38, 52 appear to have a taper, as illustrated in at least FIG. 2.

Figure 5:
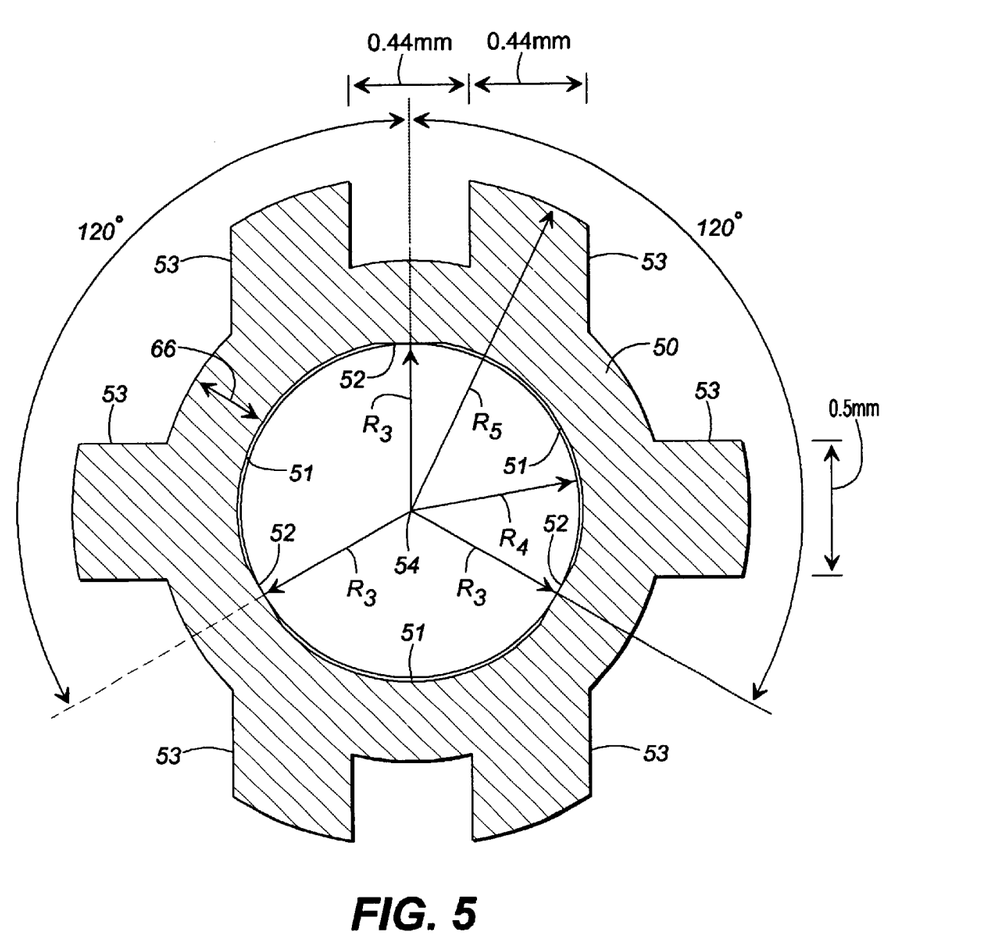
FIG. 5 is a cross sectional view of the smaller ferrule portion of the alignment sleeve of FIG. 2, taken along lines 5'—5'.

With reference to FIG. 5, a cross-sectional view of the smaller ferrule portion 14 shows the equally spaced lands 52, in which the center of each land 52 is spaced 120° from the center of the other lands 52. The radius $R_3$ of the smaller ferrule portion 14 at the lands 52 is approximately 0.6231 mm (forming an inside diameter of 1.246 mm), whereas the radius $R_4$ of the inner surface 51 is approximately 0.627 mm (forming an inside diameter of 1.255 mm). Accordingly, a ferrule that has a 1.25 mm diameter will contact the smaller ferrule portion 14 at the lands 52, leaving a small amount of clearance between the ferrule and the inner wall 52.

The thickness 66 of the wall 50 is approximately 0.30 mm in the embodiment chosen for illustrating the present invention. With a wall thickness this small, problems may arise with material flow when using injection molding fabrication techniques. Accordingly, applicants have provided ribs 53 about the periphery of the wall 50 to facilitate material flow during the injection molding process. The ribs 53 do not adversely affect the flexibility of the smaller ferrule portion 14. The outside radius $R_5$ of the smaller ferrule portion 14 at the outer edge of the ribs 53 is approximately 2.46 mm. The width of the ribs 53 are either 0.44 mm or 0.5 mm, as illustrated in FIG. 5. It is noted that the configuration of ribs 53 may vary according to the particular application of the alignment sleeve 10.

In the preferred embodiment of the present invention, the alignment sleeve 10 is made of a compliant material, such as plastic, so that the respective ferrule portions 12, 14 adapt to slight variances in the outside diameters of the ferrules received within the alignment sleeve 10. The compliant material should be flexible enough to conform to variances in the ferrule size yet stiff enough to hold and align the ferrule during the insertion process and during the lifetime of the connector. A preferred compliant material is polyetherimide with no colorant. Of particular interest, polyetherimide has a flexural modulus of 3,300 Mpa, and a coefficient of thermal expansion of 0.000056 m/m-degree C.

Figure 6:
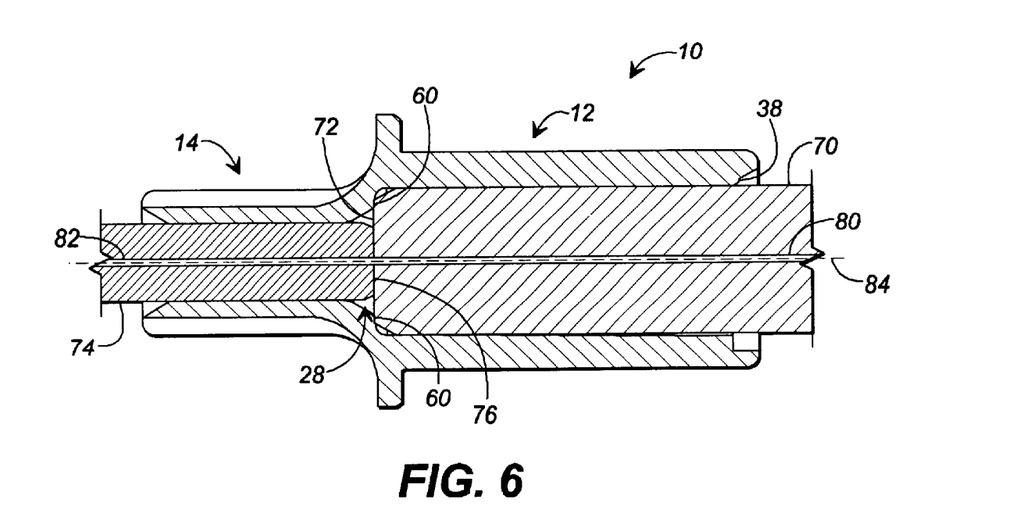
FIG. 6 is a cross-sectional view of an alignment sleeve in accordance with an embodiment of the present invention, wherein two ferrules are received within the alignment sleeve for precisely co-axially aligning the ferrules, thereby forming an optical connection therebetween.

Accordingly, an alignment sleeve in accordance with the present invention, can be designed to provide a predetermined insertion force (also referred to as pull-out force) for each ferrule portion 12, 14. In preferred embodiment, the large ferrule portion 12 designed to provide an insertion force of approximately 454 grams force, and the smaller ferrule portion 14 is designed to provide an insertion force of approximately 200 grams force. The insertion forces for the respective ferrule portions 12, 14 are designed to be less than the axial load of the connectors of the respective ferrule sizes for which the alignment sleeve is designed, for example, 2.5 mm and 1.25 mm ferrule connectors in the present embodiment. Therefore, a 2.5 mm ferrule connector which has a 2 lb. axial load will have sufficient force to completely insert the 2.5 mm ferrule into the larger ferrule portion 12. Likewise, a 1.25 mm ferrule connector which has a 1.1 lb. axial load will have sufficient force to completely insert the 1.25 ferrule into the smaller ferrule portion 14. The presence of some nominal amount of insertion force reduces the likelihood of a transverse load decoupling the two ferrules received within the alignment sleeve 10. However, the insertion force should be less than the axial load of the respective ferrule connectors in order to insure that the ferrules are brought into an abutting relationship within the alignment sleeve, as illustrated in FIG. 6. Thus, the insertion force for a ferrule portion should be greater than zero and less than the typical axial load on the inserted ferrule. The respective insertion forces for ferrule portions 12, 14 can be controlled by the design of the thickness the walls 36, 50, the inside diameter defined by the lands 38, 52, respectively, and the compliance of the material comprising the alignment sleeve. As described below, the insertion force can be finely adjusted by plating a thin metal layer on the precision core pin of the mold utilized to fabricate the alignment sleeve, or by adjusting the injection molding parameters (e.g., mold temperature or injection pressure).

With reference to FIG. 6, a larger ferrule 70, such as a 2.5 mm ferrule, is shown inserted into the larger ferrule portion 12 of the alignment sleeve 10. The larger ferrule 70 is forced into alignment sleeve 10 by its axial loading, which places the end face 72 of the ferrule 70 against the stop surface 60. A smaller ferrule 74, such as a 1.25 mm ferrule, is shown inserted into the smaller ferrule portion 14. The smaller ferrule 72 is completely inserted into the smaller ferrule portion 14 by its axial loading until its end face 76 abuts the end face 72 of ferrule 70 in a mating relationship. The larger ferrule 70 is precisely aligned within the larger ferrule portion 12 by lands 38, and the smaller ferrule 74 is precisely aligned within the smaller ferrule portion 14 by lands 52 (not shown in FIG. 6). As a result of the precision alignment of ferrules 70 and 74, the bore or passageway 80 to which an optical fiber core may be mounted and the bore or passageway 82 to which an optical fiber core may be mounted are co-axially aligned along central axis 84 of the central bore 22, as illustrated in FIG. 6. The precise co-axial alignment of the dissimilarly sized ferrules 70, 74 reduces the connection loss, and the compliance of the material comprising the alignment sleeve 10 conforms to the variances in the diameters of ferrules 70, 74.

Attenuator Embodiment

It is well known to those skilled in the art that when mating two optical fiber cores in a fiber optic connection, an offset of the mating optical fiber cores will cause an imperfect transfer of the optical signal from the transmitting optical fiber to the receiving optical fiber. While the amount of signal loss in such an imperfect transfer depends upon various parameters including the relative diameters of the respective cores, it is well accepted that there exists a relationship between the offset of mating cores and the insertion loss. It so happens that while loss attributed to core offset is unwanted, if such loss could be precisely controlled then it may have utility in various applications, such as an optical attenuator.

In fiber optic communication network designs, optical attenuators are used to reduce the power level of an optical signal, as well known in the industry. To date, however, the applicants are not aware of an attenuator capable of precisely and reliably providing low loss levels on the order of less than 3 dB. While loss due to core offset in single-mode fibers have been well documented (see Marcuse, D. "Loss Analysis of Single-Mode Fiber Splices" BSTC, 56, No. 5 (May–June 1977), pages 703–718), no device known to the applicants has been able to accurately and consistently control the amount of offset with the precision required to provide a predetermined loss, preferably at levels less than 3 dB. For example, to establish a 1 dB loss, the lateral offset should be approximately 2 $\mu$m in a single-mode fiber. A device capable of providing such an offset accurately and consistently has heretofore not been commercially available.

Figure 7:
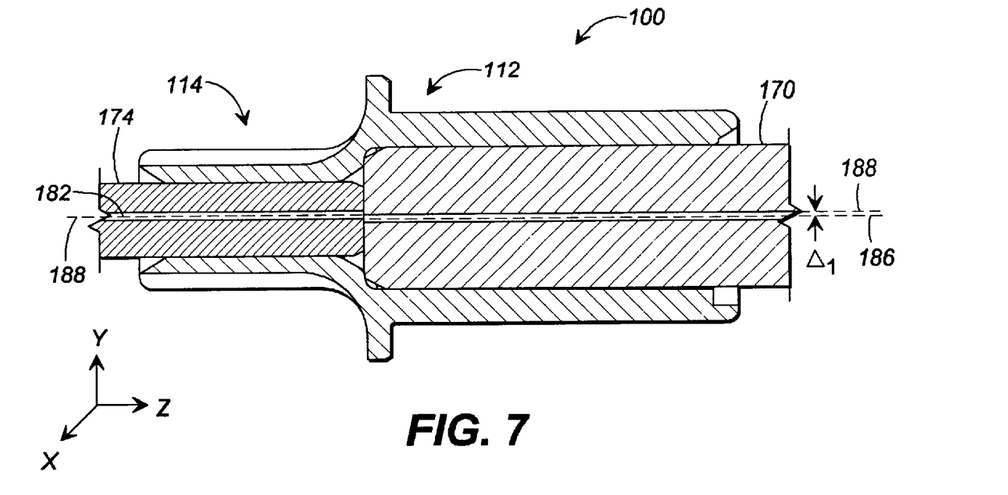
FIG. 7 is a cross-sectional view of an alignment sleeve in accordance with an embodiment of the present invention, wherein two ferrules are received within the alignment sleeve for precisely aligning the ferrules to create a predetermined axial offset of the cores.

With reference to FIG. 7, an alignment sleeve 100 in accordance with the present invention provides for an axial offset of the cores of the ferrules received within the alignment sleeve 100. As illustrated, a larger ferrule 170 is received within a larger ferrule portion 112, and a smaller ferrule 174 is received within a smaller ferrule portion 114. As discussed above, by the design of the lands of the larger ferrule portion 112 and/or the lands of the smaller ferrule portion 112, the ferrules 170, 174 can be axially offset with precision such that the central axis 186 of the larger ferrule 170 is offset from the central axis 188 and the smaller ferrule 174 by a predetermined distance $\Delta_1$ in the Y direction. It is noted, however, the offset can be in the X or Y direction, or any combination thereof. The actual offset $\Delta_1$ may be precisely defined to provide a predetermined loss in the optical signal passing between ferrules 170, 174 such that alignment sleeve 100 functions as an optical attenuator that provides low loss with precision and reliability.

Offset Launch Embodiment

It has been recognized that the splice performance in bandwidth, skew/jitter and loss may be improved if the optical signal from a single-mode fiber is launched in a multimode fiber so as to partially fill the optical modes of the multimode optical fiber. One method of achieving the improved link performance is by using a single-mode fiber pig-tail of an optical transmitter module to connect to the input side of a multimode fiber such that the centers of the single-mode and multimode fibers are misaligned by a predetermined offset. This is referred to as an offset launch condition which underfills a multimode fiber and excites only a fraction of the available modes, away from both the core center and the core/clad interface region, that then propagate without appreciable degradation within the multimode fiber. However, offset launch conditions for enhancing the bandwidth performance of a multimode optical fiber have been difficult to achieve because of the inability to provide the precise offset that can be reproduced consistently to produce the desired launch condition.

Figure 8:
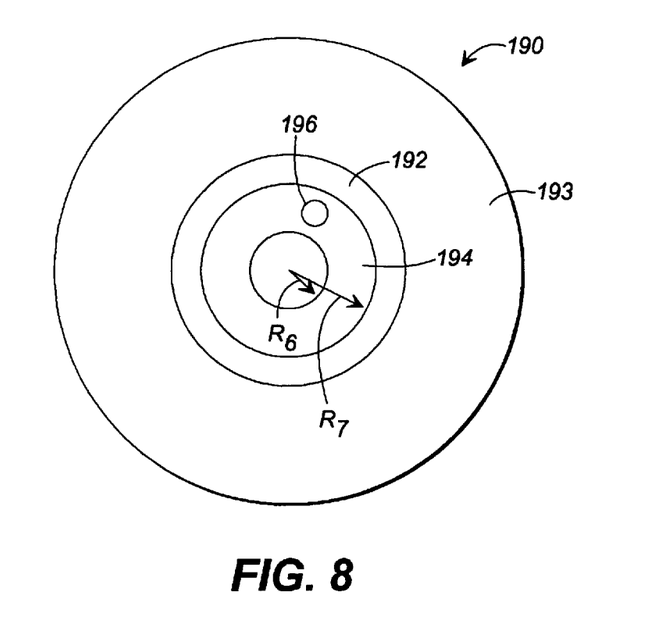
FIG. 8 is a schematic illustration of the launch area of a multimode optical fiber for an offset launch condition.

For example, with reference to FIG. 8, a receiving multimode optical fiber 190 includes a core 192 surrounded by a cladding 193. The multimode core 192 preferably has a radius of approximately 31.25 $\mu$m. Thus, the desired offset launch region 194 of the multimode fiber core 192 is defined by an annular region extending from approximately 13$\mu$m ($R_6$) to approximately 27 $\mu$m ($R_7$) from the center of the core 192 of the multimode fiber. In order to launch an optical signal into the offset launch region 194, the core offset for a single-mode fiber (assuming a diameter of 8–9 $\mu$m) should be between approximately 17 $\mu$m and 23 $\mu$m. In the case of a multimode fiber having a core radius of 25 $\mu$m, the desired launch region 194 of the multimode fiber core would extend from approximately 6 $\mu$m ($R_6$) to approximately 20 $\mu$m ($R_7$) from the center of the core of the multimode fiber, which translates into a core offset of between approximately 10 $\mu$m to 16 $\mu$m for a single-mode fiber (assuming a diameter of 8–9 $\mu$m). For illustrative purposes, the core of a launching (or transmitting) single-mode optical fiber 196 is shown in a position for an offset launch into the multimode fiber 190. Thus, there is an offset launch region 194 of the core 192 of the multimode fiber into which the optical signal should be launched, and thus, where the transmitting (i.e., launching) single-mode fiber should be positioned.

Figure 9:
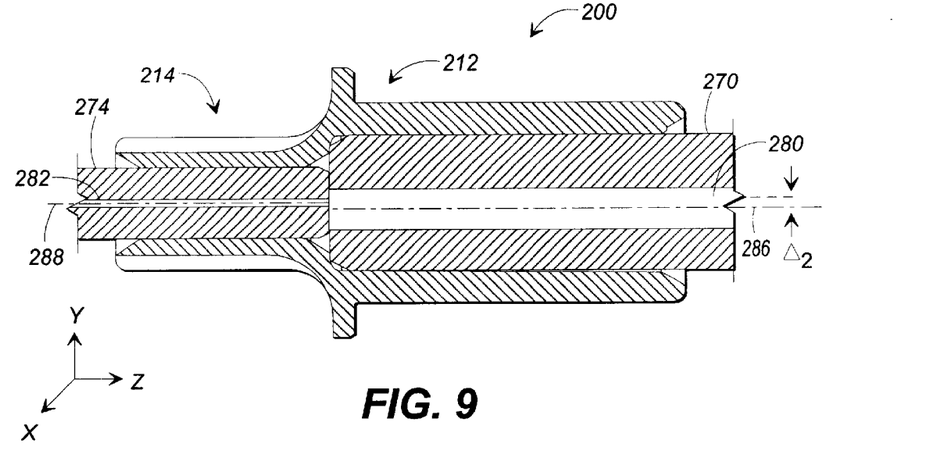
FIG. 9 is a cross-sectional view of an alignment sleeve in accordance with an embodiment of the present invention, wherein two ferrules are received in the alignment sleeve for precisely aligning the ferrules to create a predetermined axial offset of the core of the ferrules to create an offset launch condition.

Accordingly, with reference to FIG. 9, an offset launch alignment sleeve 200 in accordance with an embodiment of the present invention provides an offset that places the bore or passageway 282 to which a single-mode optical fiber core may be mounted with the first ferrule 274 within the desired launch area of the bore or passageway 280, to which a multimode optical fiber core may be mounted within the second ferrule 270. As illustrated, the central axis 288 of the passageway 282 is offset by a predetermined distance $\Delta_2$ in the Y direction with respect to the central axis 286 of the core 270. It is noted that the offset may be in the X or Y direction, or any combination thereof. As discussed above, a precise predetermined offset distance $\Delta_2$ for an offset launch can be achieved by individually controlling the size of the lands of the larger ferrule portion 212 and smaller ferrule portion 214.

Alignment Sleeve Fabrication

In order to make the alignment sleeve of the present invention low cost, the alignment sleeve may be mass produced using injection molding techniques. However, the alignment sleeve must be made with great precision in order to accurately align the cores of the ferrules within acceptable tolerances. A detailed discussion of the techniques for making a mold for injection molding of plastics can be found in the book, "Plastics Engineering Handbook of the Society of Plastics Industry, Inc.," Michael L Barons, editor, Van Norstrand Reinhold, New York, 1991.

To achieve the accuracy of the features of the central bore 22 to produce the precise alignment of the ferrules received therein, a precision core pin 300, as illustrated in FIG. 8, may be utilized. The core pin 300 operates as a central component of the mold used in the injection molding process. In particular, the core pin 300 is disposed longitudinally within an outer mold which defines the outside features of the alignment sleeve, such as the ribs 53 and the retaining ring 16. The fluid plastic material out of which the alignment sleeve is fabricated can be injected into the mold by a variety of different ways, such as through a ring gate or from both ends.

Figure 10:
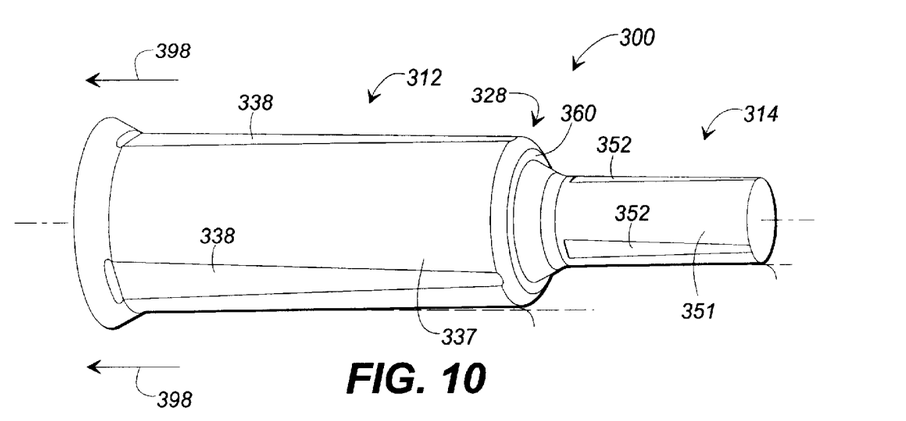
FIG. 10 is a perspective view of a precision core pin in accordance with an embodiment of the present invention.

The core pin 300 is preferably made of a hard metal, such as S7 tool steel, which can be machined using a precision grinder or lathe. The core pin 300 includes a large pin portion 312 and a small pin portion 314 which are interconnected by a transition portion 328. The large pin portion 312 and the small pin portion 314 are preferably fabricated at the same time to ensure co-axial alignment of the two pin portions. The transition portion 32 includes a stop wall 360 which corresponds to the stop surface 60 of the alignment sleeve 10. The core pin 300 includes a taper from the large pin portion 312 to the small pin portion 314. The taper is preferably continuous along the length of the core pin 300, and is preferably less than 5 degrees. In the preferred embodiment, the taper is approximately $\theta$=0.5°. The taper is provided to facilitate the removal of the core pin 300 from the molded alignment sleeve, for example, in the direction of the arrows 398. The taper is provided in the surfaces 337 and 351, which corresponds to the inner surfaces 37, 51 of the alignment sleeve 10. It is noted that the inner surfaces 37, 51 are non-functional with regard to the operation of the alignment sleeve 10 (i.e., inner surfaces 37, 51 do not contact the ferrules inserted into the alignment sleeve).

The flats 338, 352 that are cut into the core pin 300 form lands 38, 52 of the alignment sleeve 10. The size of the lands 38, 52 can be individually controlled by the depth of the cut of the corresponding flat 338, 352. Each one of the flats 338 corresponds to one of the flats 352, wherein corresponding flats are cut into the core pin 300 at the same time so that the flats, and the resulting lands, are aligned. The flats 338, 352 are preferably parallel to the central axis 354 of the core pin 300, that is, the radius from the central axis 354 to the center of a flat 338, 352 is substantially the same through the length of that flat 338, 352. Since the flats 338, 352 do not have the taper, the flats 338, 352 have the appearance of a taper in FIG. 10.

Once the core pin 300 has been fabricated, the precise dimensions of the alignment sleeved formed therefrom can be finely adjusted by selectively plating portions of the core pin with a thin layer of metal, which increases the size of the core pin in the plated regions, and thus, the size of the central bore of the alignment sleeve in the corresponding regions. In a preferred embodiment, the metal plated to the core pin 300 is titanium nitride, though other suitable metals such as chrome may be utilized. For instance, if the insertion force of a ferrule into an alignment sleeve fabricated using a core pin in accordance with the present invention is higher than desired, then the core pin can be selectively plated to increase the inside diameter as defined by the lands. Using known techniques that are available through commercial platers, the plating can be controllable plated to a thickness of approximately 0.050 μm.

It is noted that the physical dimensions of the alignment sleeve may be finely adjusted by changing the molding parameters such as the injection pressure, mold temperature, etc. By monitoring the insertion force of a ferrule into a sleeve, the molding parameters can be adjusted to provide an acceptable sleeve. When monitoring of the insertion force indicates an unacceptable fit, the molding parameters can be adjusted to change the insertion forces by modifying the plastic sleeve size.

Many modifications and other embodiments of the invention will come to mind to one skilled in the art to which this invention pertains having the benefit of the teachings presented in the foregoing description and the associated drawings. Therefore, it is understood that the invention is not to be limited to the specific embodiments disclosed and that modifications and other embodiments are intended to be included within the scope of the appended claims. Although specific terms are employed herein, they are used in a generic and descriptive sense only, and not for purposes of limitation.

What is claimed is:

1. An alignment sleeve for axially aligning ferrules, comprising:
    a support member defining a substantially central bore therethrough, said bore including a first portion and a second portion, wherein said first portion and said second portion are longitudinally aligned and proximate one another;
    said support member including a first inner wall which at least partially defines said first portion, wherein said first inner wall includes a plurality of first lands that are symmetrically spaced about said first inner wall, said first lands being sized to receive a first ferrule of a first diameter; and
    said support member including a second inner wall which at least partially defines said second portion, wherein said second inner wall includes a plurality of second lands that are symmetrically spaced about said second inner wall, said second lands being sized to receive a second ferrule of a second diameter that is dissimilar to said first diameter.

2. The alignment sleeve of claim 1, wherein said first lands and said second lands co-axially align a first ferrule received in said first portion and a second ferrule received in said second portion.

3. The alignment sleeve of claim 1, wherein said first lands and said second lands axially offset, by a predetermined distance, a first ferrule received in said first portion and a second ferrule received in said second portion.

4. The alignment sleeve of claim 1, wherein said first portion and said second portion are co-axially aligned and wherein a first one of said first lands is dissimilarly sized to a second one of said first lands wherein a first ferrule received in said first portion is non-concentrically aligned with said first portion, wherein said first ferrule received in said first portion and a second ferrule received in said second portion are axially offset.

5. The alignment sleeve of claim 1, wherein said central bore is progressively tapered at a predetermined angle less than approximately 5 degrees.

6. The alignment sleeve of claim 1, wherein said first lands are equally spaced about said first inner wall.

7. The alignment sleeve of claim 1, wherein said bore includes a first end adjacent said first portion and a second end adjacent said second portion, wherein said first end and said second end include beveled inner edges that assist entry of a ferrule into said bore.

8. The alignment sleeve of claim 1, wherein said first portion includes three first lands and said second portion includes three second lands.

9. The alignment sleeve of claim 1, wherein said support member comprises polyetherimide.

10. The alignment sleeve of claim 1, wherein said first inner wall comprises a compliant material that radially expands when a first ferrule is received within said first portion, and said second inner wall comprises said compliant material that radially expands when a second ferrule is received within said second portion.

11. An alignment sleeve for axially aligning ferrules, comprising:
    a support member defining a substantially central bore therethrough, said bore including a first portion sized to receive a first ferrule of a nominal first diameter and a second portion sized to receive a second ferrule of a nominal second diameter that is dissimilar to said first diameter, wherein said first portion and said second portion are longitudinally aligned and proximate one another;
    said support member including a compliant first wall at least partially defining said first portion, wherein said first wall is deformable to accommodate slight variances in said nominal first diameter; and
    said support member including a compliant second wall at least partially defining said second portion, wherein said second wall is deformable to accommodate slight variances in said nominal second diameter.

12. The alignment sleeve of claim 11, wherein said first wall includes a first inner surface having a plurality of first lands and said second wall includes a second inner surface having a plurality of second lands.

13. The alignment sleeve of claim 12, wherein said first lands and said second lands.

14. The alignment sleeve of claim 12, wherein said first lands and said second lands co-axially align a first ferrule received in said first portion and a second ferrule received in said second portion.

15. The alignment sleeve of claim 12, wherein said first lands and said second lands axially offset, by a predetermined distance, a first ferrule received in said first portion and a second ferrule received in said second portion.

16. The alignment sleeve of claim 12, wherein said first portion and said second portion are co-axially aligned and wherein a first one of said first lands is dissimilarly sized to a second one of said first lands wherein a first ferrule received in said first portion is non-concentrically aligned with said first portion, wherein said first ferrule received in said first portion and a second ferrule received in said second portion are axially offset.

17. The alignment sleeve of claim 11, wherein said support member comprises polyetherimide.

18. A method for forming a core pin for use in making a ferrule alignment sleeve by an injection molding process, comprising:

fabricating a core pin including a first pin portion of a first diameter and a second pin portion of a second diameter dissimilar to the first diameter; and fabricating a plurality of flats on each of the first and second pin portions.

19. The method of claim 18, wherein said step of fabricating the core pin includes forming a longitudinal taper over the length of the core pin to facilitate removal of the core pin during the injection molding process.

20. The method of claim 18, wherein the core pin includes a central axis, and wherein said step of fabricating the flats includes the step of fabricating at least three equally angularly spaced flats on the first pin portion that are parallel to the central axis of the core pin.

21. The method of claim 18, wherein said step of fabricating the flats includes the step of fabricating first flats on the first pin portion of the core pin and second flats on the second pin portion of the core pin, wherein each of said first flats is parallel to a corresponding second flat.

22. A method for making an alignment sleeve for axially aligning ferrules of dissimilar size, comprising:

providing a mold including a precision core pin having a first pin portion of a first diameter and a second pin portion of a second diameter dissimilar to the first diameter, and the core pin including a plurality of flats on each of the first and second pin portions; and fabricating an alignment sleeve about the core pin using the mold, the alignment sleeve including a bore therethrough, the bore comprising a first bore portion for receiving a first ferrule of a first diameter and a second bore portion, axially aligned with the first bore, for receiving a second ferrule of a second diameter that is dissimilar to the first diameter.

23. The method of claim 22, wherein said step of fabricating the alignment sleeve includes the step of forming the first bore portion which corresponds to the first pin portion of the core pin and the second bore portion which corresponds to the second pin portion of the mold, wherein each of said bore portions includes a plurality of lands defined by the flats of the first and second pin portions of the core pin.

24. The method of claim 22, wherein said step of fabricating the alignment sleeve includes the step of fabricating the alignment sleeve with a material comprising polyetherimide.

25. The method of claim 22, further including the step of plating at least one of the first pin portion and the second pin portion of the core pin with a metal layer to increase the inside diameter of the first bores.

26. The method of claim 22, further including the step of measuring one of the insertion force and removal force of a ferrule into the alignment sleeve.

27. The method of claim 22, wherein said step of fabricating the alignment sleeve includes the step of forming the alignment sleeve with a compliant material that radially expands when a first ferrule is received within one of the first and second bores.

* * * * *